United States Patent [19]

Wanzong et al.

[11] Patent Number: 5,319,298

[45] Date of Patent: Jun. 7, 1994

[54] BATTERY MAINTAINER AND CHARGER APPARATUS

[76] Inventors: Vern Wanzong, 8022 Wind Forest Dr., Houston, Tex. 77040; A. Gerald Marquez, 615 Bennington, Houston, Tex. 77022

[21] Appl. No.: 785,945

[22] Filed: Oct. 31, 1991

[51] Int. Cl.$^5$ .............................................. H02J 7/00
[52] U.S. Cl. ...................................... 320/22; 320/39
[58] Field of Search ................................. 320/22-24, 320/39, 40

[56] References Cited

U.S. PATENT DOCUMENTS

| | | |
|---|---|---|
| 3,919,618 | 11/1975 | Coleman et al. .................. 320/39 |
| 4,021,717 | 5/1977 | Furuishi et al. .................. 320/39 |
| 4,742,290 | 5/1988 | Sutphin et al. .................. 320/23 X |

*Primary Examiner*—R. J. Hickey
*Attorney, Agent, or Firm*—Alton W. Payne

[57] ABSTRACT

A current limited, voltage regulated, battery maintainer and charger apparatus includes a circuit for monitoring and maintaining a 12 volt storage battery, determining the presence of forward polarity and in response controlling the amount of charging current necessary to continuously maintain the battery in a ready state, without overcharging or causing other damage to said battery. The battery maintainer device selectively charges 12 volt lead acid, gel-cell or sealed lead acid batterys using current limitation and voltage regulation circuitry, to modulate an amount of current to maintain a voltage potential across the battery, whereby the current flow can drop to zero current flow, to maintain a constant and continuous storage battery voltage of 13.8 volts. The battery maintainer apparatus also includes a variety of safety features not ordinarily associated with a battery charger including but not limited to a circuit which shuts out charging current when reverse polarity is detected, a feature whereby current is not supplied to the output terminals until said terminals have come in contact with a storage battery of sufficient initial voltage, thus preventing the output terminals from sparking should they accidentally contact each other prior to hook-up with the storage battery. Furthermore, the battery maintainer device is designed for constant, continuous and non-supervised use on all 12 volt lead acid, gel-cell, and sealed lead acid batteries.

1 Claim, 6 Drawing Sheets

BATTERY MAINTAINER AND CHARGER APPARATUS

FIELD OF THE INVENTION

The present invention relates generally to an electronic battery charger apparatus. Specifically, the present invention relates to a 12 volt lead acid, gel-cell or sealed lead acid battery maintainer and charge preservation apparatus which electrically maintains the voltage of a 12 volt battery at an optimum voltage, to obtain a maximum battery life. The present invention may be used continuously and indefinitely, without damaging the battery from the harmful side effects associated with overcharging.

BACKGROUND OF THE INVENTION

Lead acid, gel-cell and sealed lead acid batteries yield their optimum life-span when they maintain an appropriate and adequate charge and are not repeatedly, depleted and recharged. It is a well known phenomena that lead acid, gel-cell and sealed lead acid batteries lose their charge if not electrically engaged with a charging apparatus on a frequent and regular basis. Furthermore, when lead acid, gel-cell and sealed lead acid batteries sit idly, they will lose their charge due to natural discharging.

Batteries which are used less than once a month are prone to premature failure due to the natural discharging effect of the battery. Although lead acid, gel-cell and sealed lead acid batteries can be recharged, the cyclic charging and discharging will prematurely deteriorate these batteries. A 12 volt lead acid, gel-cell or sealed lead acid battery will yield a maximum life expectancy when the voltage is continuously kept at the manufacturer's recommended voltage of 13.8 volts.

When recharging current supplied to a rechargeable battery is continued past a point of full recharge, the battery may suffer the effects of overcharging, out-gassing, overheating, speeding up of the electrolyte reaction within the battery, evaporation of electrolyte and ultimately resulting in shortening the life of a 12 volt lead acid, gel-cell or sealed lead acid battery.

A large number of battery chargers have been developed for use in recharging batteries. Typically, battery charges have used the principal of current limiting to recharge batteries. However, using such chargers over an extended period of time, can overcharge the battery and result in premature failure. Some of these battery chargers also include sophisticated voltage monitors and charging controllers, however, these chargers similarly fail to protect against overcharging during unsupervised extended time use.

It is, therefore, a feature of the present invention to provide a current limited voltage regulated dual rate battery maintainer and charging apparatus which in normal use provides for charge preservation of 12 volt lead acid, gel-cell and sealed lead acid batteries at the manufacturer's suggested voltage.

Another feature of the present invention is to provide a current limited voltage regulated dual rate battery maintainer and charging apparatus which meets with 12 volt lead acid, gel-cell and sealed lead acid battery manufacturer's requirements for maintaining a 12 volt battery at it's optimum charge.

Another feature of the present invention is to provide a means which prevents harmful cyclic charging and discharging of 12 volt lead acid, gel-cell and sealed lead acid batteries.

Another feature of the present invention is to provide a means of continuous current limitation, to maintain the battery at a constant desirable voltage.

Another feature of the present invention is to provide safety features to protect from improper battery hookup, preventing the overcharging of an adequately charged or over-charged battery and preventing the charging of a battery with no potential for holding a charge.

U.S. Pat. No. 3,688,177 issued to Reeves et al. on Aug. 29, 1972 describes a battery charger which regulates the charging current by regulating the firing angle of a controllable rectifier; U.S. Pat. No. 3,919,618 which issued to Coleman, et al. on Nov. 11, 1975 describes a hysteresis battery charger and includes a charging network having a series of pass elements for delivering charging current to a battery; U.S. Pat. No. 4,386,308 which issued to Emile, Jr., et al. on May 31, 1983 teaches a hysteresis type battery charger including a circuit for monitoring battery voltage and controlling charging current to a battery; U.S. Pat. No. 4,509,102 which issued to Ayer on Apr. 2, 1985 describes a battery current switch having an opto-isolated switch; U.S. Pat. No. 4,663,580 which issued to Wortman on May 5, 1987 describes a sealed lead acid battery float charger and power supply which includes a predetermined non-linear temperature coefficient compensation network; U.S. Pat. No. 4,698,580 which issued to Yang on Oct. 6, 1987 describes an automatic charging or cut-off circuit device for intermittent pulsating DC charging power supply which automatically cuts-off when the battery becomes fully charged; U.S. Pat. No. 4,742,290 which issued to Sutphin et al. on May 3, 1988 teaches a recharging battery charger; and U.S. Pat. No. 5,013,992 which issued to Eavenson et al. on May 7, 1991 teaches a microprocessor controlled battery charger.

The aforementioned devices, although useful for a particular application, do not provide for the same purpose, needs or applications desired as those in the current device. Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, a current limited voltage regulated dual rate battery maintainer and charger apparatus is provided to prevent the damaging effects of standard battery charges and protect against the out-gassing and over-heating associated with overcharging. The present invention represents a battery maintainer and charger apparatus which maximizes the life of 12 volt lead acid, gel-cell and sealed lead acid batteries which are used on an occasional basis. The typical 12 volt lead acid, gel-cell and sealed lead acid battery for which the present invention is designed would include batteries for boats, motorcycles, tractors, snowmobiles, backup power supplies and any automobile or motorized vehicle not driven on a regular basis. None of the prior art battery chargers teach or use current limited charging techniques or the safety features which protect the user and the storage battery.

The present apparatus is comprised of: an input terminal to be connected to a source of electrical energy; an output terminal to be connected to a storage battery; an integrated circuit for generating an internal voltage reference; an analog to digital convertor for monitoring voltage of the battery to be charged; a bar graph charger output indicator, indicating the amount of charge provided to the battery; a current limiting circuit to provide for a constant and continuous supply of current; a controller comprised of a timer and one or more voltage regulators; an over-voltage alarm system; a stabilizing resistor and main ground to maintain the setpoint references at constant values and a bias circuit composed of isolating transistors and blocking diodes to prevent over-charging.

The battery maintainer and charger apparatus, in accordance with the invention, comprises a battery voltage monitoring circuit that compares the battery voltage with two reference voltages and in response controls a means for providing either a high rate of charging current or a trickle or float charging rate of current to the storage battery.

The battery maintainer and charger apparatus of the present invention couples the improvements of automatic and non-supervised battery charging maintenance with a low cost, durable device specifically designed for preserving the charging current of lead acid, gel-cell and sealed lead acid 12 volt batteries. The battery maintainer and charger apparatus of the present invention allows charging current to maintain a maximum value established by the circuit components until the battery is fully charged at which time the charging current is reduced to a non-damaging minimal amount of charging current which will continue to charge indefinitely. The battery maintainer apparatus can periodically alternate between the high charging rate and low charging rate depending upon the needs of the battery. The present invention provides for a continuous charging function that asymptotically approaches and maintains the correct charge.

Other improvements of the present invention will become readily apparent to those skilled in the art from the following detailed description, wherein the preferred embodiments of the invention are illustrated and described and the best mode contemplated of carrying out the invention is disclosed. As will be realized, the invention is capable of different embodiments, and its several details are capable of modifications in various respects, all without parting from the invention. Accordingly, the drawings and description are to be regarded as illustrative in nature, and not as restrictive.

DESCRIPTION OF THE PREFERRED EMBODIMENTS

Figure 1:
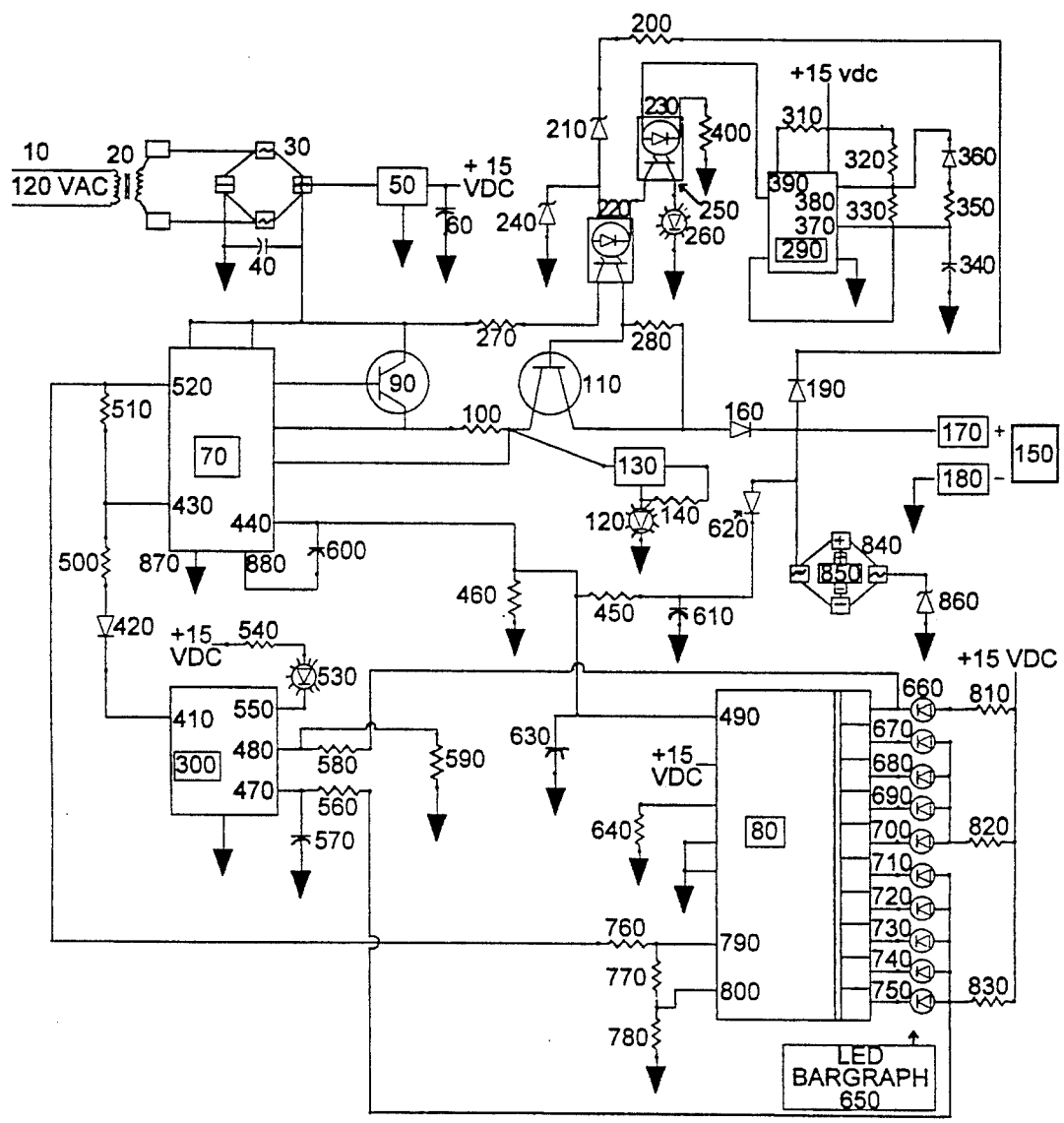
FIG. 1 is a circuit diagram of a battery maintainer and charger apparatus in accordance with the present invention.

Referring to FIG. 1, there is shown an electrical schematic diagram, the circuitry of which comprises the battery maintainer and charger apparatus 05. A source of alternating current 10 enters the device and contacts a step down transformer 20 which takes the line voltage and transforms it down to approximately 20 volts AC. Alternating current from the step down transformer 20 is then sent to a full wave bridge rectifier 30 which yields pulsing DC voltage which is filtered by the main capacitor 40. Filtered DC voltage from the main capacitor 40 is then distributed to a three lead voltage regulator labeled 50 where a filtered capacitor 60 is used to stabilize the output of the voltage regulator 50, as power is distributed throughout the circuit for the 15 volt on board power supply 20. Filtered DC voltage from the main capacitor 40 is then transmitted to a commercial voltage regulator integrated circuit 70 which is a standard electrical component known as a National Semiconductor LM723. The flow of filtered DC voltage from the voltage regulator integrated circuit 70 generates an internal voltage reference which is shared with an analog to digital convertor 80 which is a National Semiconductor LM3914. The analog to digital convertor 80 internally provides the reference voltage setpoints to control the charging rate of the apparatus 05 of the present invention. The main power transistor 90 is directly controlled by the voltage regulator integrated circuit 70 and its output passes through a small resistor 100. Both ends of that resistor 100 are monitored within the voltage regulator integrated circuit 70 to sense the flow of DC current. The electrical power that will be available on the output of the power transistor 90 will then be passed to two devices, the isolation transistor 110 and the power indicating light 120. Power from the main transistor 90 reaches the power indicating light 120 via a current limiting transistor 130 which applies an output voltage to one side of a resistor 140. At such time as a 12 volt lead acid, gel-cell or sealed lead acid storage battery 150 is connected to the isolation transistor 110 electrical current passes through a final isolating diode 160 and is sent to the battery 150 by way of output terminals 170 and 180. At this point, the battery 150 receives a maximum charging current of 300 miliamps or some lessor charging current between 299-0 miliamps depending upon the charge of the battery 150.

When the polarities between the battery 150 and output terminals 170 and 180 are the same, current passes through an isolating diode 190 and passes through a current limiting resistor 200. Resistor 200 is used to limit the current through the forward bias LED 260 of optical isolator 230. When the current passing through resistor 200 is of high enough potential, it similarly passes through a blocking zener diode 210 and will flow to a first optical isolator 220 and then to the second optical isolator 230. A second zener diode 240 is positioned within the circuitry to provide protection for the first optical isolator 220 in the event that an over voltage or voltage above the designed parameter is encountered. The zener diode 240 will shunt the excess current to ground rather than damage the electronics. When current flows through the second optical isolator 230, it will flow out the emitter 250 and will engage a second light emitting diode 260 which indicates that there is continuity or proper polarity between the battery maintainer apparatus 05 and the storage battery 150. The second optical isolator 230 is interrupted in a cyclical fashion for the purpose of momentarily disconnecting or re-isolating the present invention from the storage battery 150 in the event that said battery becomes disconnected either by cut wire or through operator error. The interruption will turn off the isolating transistor 110 and upon reenergization there would be no current present from the battery terminals 170 and 180.

A resistor 270 is provided as a current limiting bias resistor for the isolating transistor 110. Voltage from the power supply 30 is provided to one side of the resistor 270. The resistor 270 functions as a current limiter passing its current through an optical isolator 220. When the optical isolator 220 is turned on the current comes out of the optical isolator 220 and pulls down a resistor 280 and into the base of the isolating transistor 110. The pull down resistor 280 provides a positive shut off for the isolating transistor 110 whenever the optical isolator 220 is de-energized.

The timer circuit, comprising two halves 290 and 300, is a National Semiconductor LM556C chip and utilizes C-MOS technology. The timing circuit 290 and 300 is a dual timer where half of the timing circuit is illustrated in the figure as location 290 and the other half of the timer circuit is illustrated in the figure as location 300. The timer circuit 290 and 300 encompasses a number of safety features. In the event that there is no load connected to the timer circuit 290, the timer circuit 290 will interrupt the isolation transistor 110, by turning off the optical isolator 230 and the blocking diode 190 will be denied any current. When current flow through the diode 190 is detected, the optical isolator 220 will cease to conduct and the isolating transistor 110 stays off and prevents any output current from the voltage regulator integrated circuit 70. The LED 260 only becomes illuminated when there is forward current flow which indicates a proper polarity connection between the output terminals 170 and 180 and the storage battery 150.

A resistor 310 is a pull up resistor that is applied to the timer circuit 290 to allow the timing circuits 290 and 300 to run in an astable mode. The resistors 320 and 330 provide for the charging of the capacitor 340 and a discharge of the capacitor 340 back through the pull down resistor 350 and the diode 360. Voltage is provided through the resistors 320 and 330 to a pin 370 on the timer labeled "threshold." When the voltage of the pin 370 approaches two thirds of the 15 volt power supply the timer circuit 290 internally switches and applies a low output on the discharge pin 380. The discharge pin 380 pulls the stored voltage out of the capacitor 340 and it discharges that capacitor through a parallel circuit composed of the resistor 330, the resistor 350 and the diode 360. The net result of the discharge of the capacitor 340 through the resistor 330, the resistor 350 and the diode 360 is the generation of a square wave at the output pin 390. Output at the pin 390 provides an intermittent power source for the optical isolator 230. This intermittent power source will interrupt the charging flow as part of the automatic disconnect feature. A resistor 400 is a current limiting resistor for the optical isolator 230 voltage supplied by the astable timer 290 cycled between 0 and 15 volts.

The second half of the timer circuit 300 is used as a hysteresis latch for the selection of the reference charging voltage set points. The timer circuit 300 is a C-MOS device allowing its output lead to approach DC ground. Output lead pin 410 has an output of 15 volts and is blocked by the diode 420. The diode 420 is of reverse bias and does not conduct a current through the reference voltage provided to the input pin 430 of voltage regulator integrated circuit 70 as compared to pin 440. The pin 440 reads a voltage that is divided by resistors 450 and 460, allowing the battery maintainer apparatus 05 to regulate an adjustable voltage as established by the ratio of the resistors 450 and 460. A ratiometric voltage is compared to its internal reference for a set point. The internal reference voltage is determined at the input pin 430. The timer circuit 300 contains the "set" pin 470 and "reset" pin 480 and these functions are engaged by the analog to digital convertor 80. The analog to digital convertor 80 reads the same ratiometric voltage as the voltage regulator integrated circuit pin 440. This reading is obtained at a pin 490 located within the analog to digital convertor 80. When the timer circuit 300 is "reset" mode at pin 480 the output on pin 410 goes to a low voltage output which approaches DC ground. The diode 420 is a forward bias diode and conducts the resistor divider network comprising the resistors 500 and 510. The resistors 500 and 510 divide the reference voltage and apply that divided voltage signal back to the pin 430 of the voltage regulator integrated circuit which in essence becomes the low voltage set point, commonly referred to as "trickle" charge. The voltage reference pin 520 is used to supply current to the resistor divider network composed of the resistors 500 and 510.

When the output pin 410 is set to a low voltage set point and the diode 420 is conducting, providing a reduced reference voltage to voltage regulator integrated circuit input pin 430, an LED 530 will illuminate indicating a low voltage charging rate is being applied to the storage battery 150. The LED 530 is similarly provided with a current limiting resistor 540. A pin 550 found on the timer circuit 300 will be at logic level 0 at the same time the output pin 410 is at logic level 0. Internally, the pins 410 and 550 are two different transistors so that they are parallel but different. There is no interaction of the current flow between the pins 410 and 550. When the hysteresis latch function is triggered on the pin 470, there is a current limiting resistor 560 and a filtering capacitor 570 which provide a stable trigger into the hysteresis timer circuit 300. Further, there is a current limiting resistor 580 and a voltage dividing resistor 590 to provide a reset signal for the hysteresis timer 300 that is low enough to meet the voltage requirement of said timer. The industry standard for the timer 300 requires a logic level on the order of 0.8 volts DC. A capacitor 600 is a recommended component by the manufacturer of the voltage regulator integrated circuit 70 and provides a filtered stability between the input signal on the pin 440 and the compensation pin 880 of the integrated circuit 70. Without the component 600, there is a potential for the voltage regulator integrated circuit 70 to oscillate at rapidly changing signals. A filtering capacitor 610 provides stability for the signal in the event that the operator is interrupting the connection to the storage battery 150 and the battery maintainer apparatus 05. A blocking diode 620 is placed within the circuitry to prevent reverse current flow in the event of incorrect polarity between the storage battery 150 and the battery maintainer apparatus 05. An additional filtering capacitor 630 is provided to stabilize the divided voltage signal as it goes into the voltage regulator integrated circuit 70 at the pin 440 and the analog to digital convertor 80 at the pin 490. The analog to digital convertor 80 has a programming resistor 640 which determines the sinking current provided for display in the LED bar graph 650. The LED bar graph 650 is composed of 10 LED's indicating the voltage which is being applied to the storage battery 150. The LED bar graph 650 has indicator LED's noting 12.8 volts 750; 13.0 volts 740; 13.2 volts 730; 13.4 volts 720; 13.6 volts 710; 13.8 volts 700; 14.0 volts 690; 14.2 volts 680; 14.4 volts 670; and 14.6 volts 660.

A resistor 760 is fed with reference voltage out of pin 520. It forms a two point voltage divider utilizing a first resistor 760, a second resistor 770 and a third resistor 780. The junction of the first resistor 760 to the second resistor 770 provides a high voltage reference 790 to the analog to digital convertor 80. A reference pin 790 will set the reference voltage required to achieve the highest voltage value LED 660 of the LED bar graph 650. The voltage reference point 800 will reference the voltage necessary in order to light the lowest voltage potential LED 750 of bar graph 650. The LED bar graph 650 is supplied with voltage from three discrete current limiting resistors. These resistors are: a pull up resistor 810 which provides a current source for the high most voltage indicating LED 660; a resistor 820 and a resistor 830. The high most voltage indicating LED 660 and the lower most voltage indicating LED 750 comprise the outermost limits for the LED bar graph 650. The voltage would initially pass through the lower most LED 750 up through the higher LED's and ultimately through the forward bias LED 660 and would then end up being supplied to the current limiting resistor 580 into the reset pin 480 of the hysteresis timer 300 and divided down with the resistor 590. The LED's 670, 680, 690 and 700 are sourced from the resistor 820 and they will indicate intermediate voltage as the battery 150 is off cycling between its trickle voltage set point and its recharge set point. The lower most LED's of the bar graph 650 consist of the LED's 710, 720, 730, 740 and 750 are sourced from the resistor 830 and they are wired as a logical "OR." If any of the LED's 710 through 750 are illuminated, the junction of the resistor 830 and forward biasing of the diodes 710 through 750 will lower the voltage of that junction and cause the triggering of the hysteresis timer 300 from the pin 470.

In the over voltage/under voltage indication area, there is a full wave bridge rectifier 840 which is used to provide a forward current flow through a piezeo-electrical beeper 850. The function of the full wave bridge rectifier 840 is to monitor the voltage available at the electrically positive battery terminal 170 and in the event that the battery voltage is in excess of designed parameters, the potential would be funnelled through the full wave bridge rectifier 840 and allowed to pass through the piezeo-electric beeper 850 in a forward bias condition and then be applied to the zener diode 860. If the voltage potential flowing through the full wave bridge rectifier 840 is great enough, the zener diode 860 will break down and flow current in reverse bias and cause the electric beeper 850 to beep. In the event of reverse polarity being applied to the battery terminals 170 and 180, the current flow is through the forward bias zener diode 860 and again the full wave bridge rectifier 840 provides a positive current flow to the piezeo-electric beeper 850 and then back to the battery 150.

Figure 2:
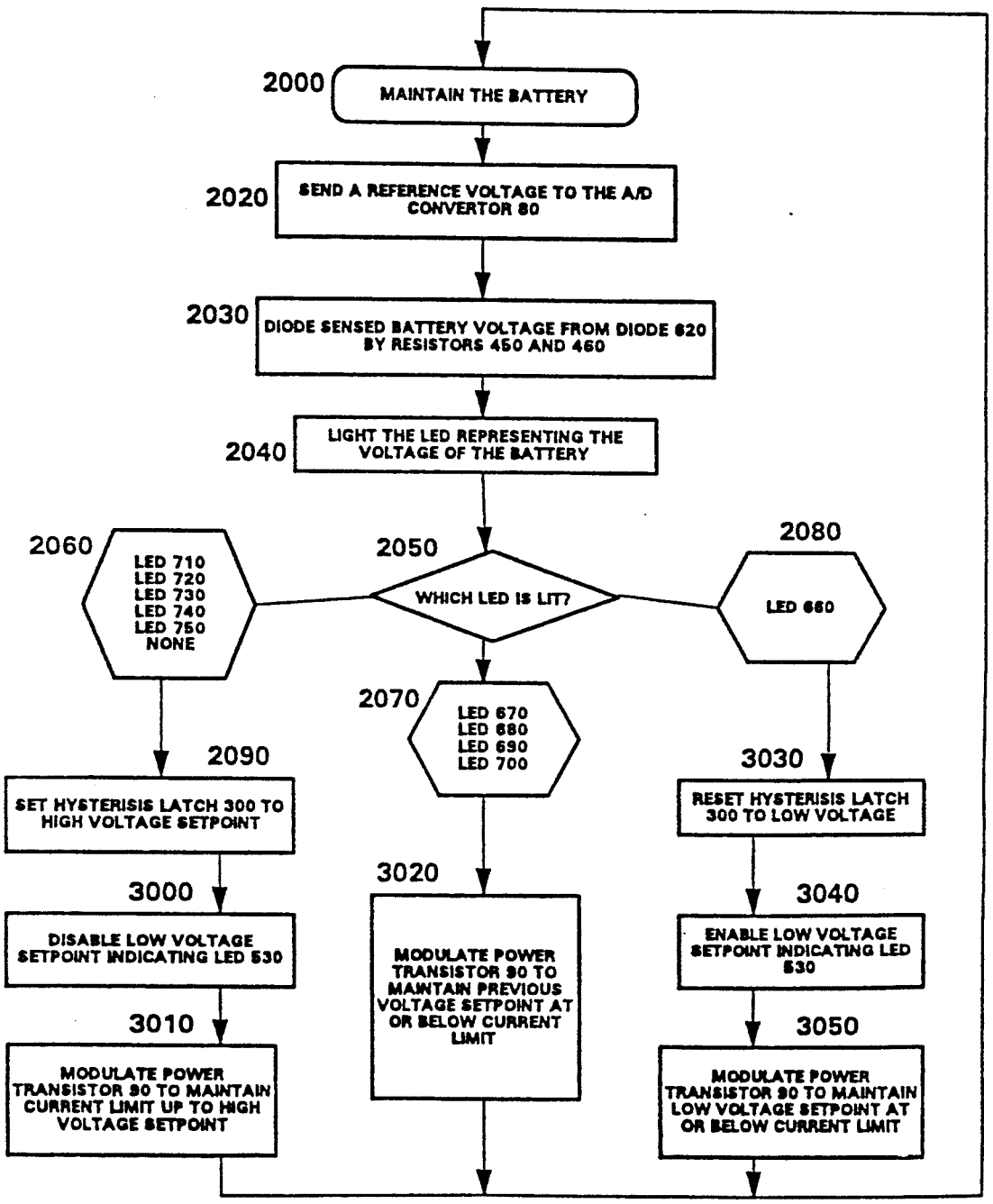
FIG. 2 is a flow diagram illustrating the functions of the battery maintainer and charger apparatus in establishing a minimum acceptable amount of battery voltage and for proper battery polarity determination necessary to allow the apparatus to begin charging.
Figure 5:
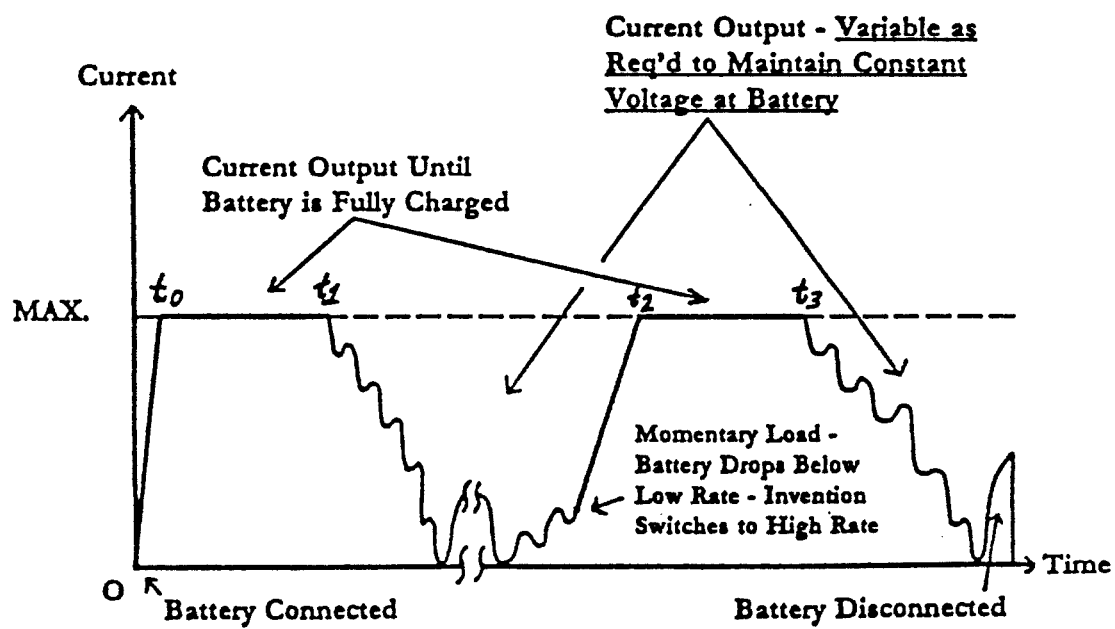
FIG. 5 illustrates the limited current output of the present invention over time.

Now referring to FIG. 2 and FIG. 5 in combination, a flow diagram for determining acceptable storage battery charge, proper battery polarity and excessive storage battery voltage, is depicted. The battery maintainer and charger circuit 1000, once energized is in a constantly monitoring condition 1010. A determination must first be made as to whether or not a battery has come into contact with the present invention 1010. Once the circuit 1000 has determined that a battery has been connected to the present invention, the second question addressed is whether the battery has been connected under proper polarity or has been connected backwards, under reverse polarity 1020. If a determination has been made that the battery has been connected under the principal of reverse polarity, an electronic beeper 1030 is activated to indicate reverse polarity. Next, an isolating transistor 1040 is switched off, disabling the power supply 20. Once the isolating transistor 110 has been turned off 1040, the continuity LED 260 is disabled 1050 since continuity no longer exists between the storage battery and the present invention. Control is then transferred back to the circuit 1000 where the circuit again waits for connection to a storage battery 1010.

If the battery is connected properly, according to polarity then the battery voltage must next be evaluated 1060. If the battery voltage is below a predetermined first reference set point and said set point is too low to begin charging, the isolating transistor 110 is turned off 1040 disabling the continuity light 1050 and control is again returned to the circuit.

If the battery voltage is above a predetermined second reference set point, the continuity light 260 is illuminated 1070 and a signal is sent to the beeper 1090 to indicate that the storage battery is in a over voltage condition. Control is thus again restored to the circuit. If the charge of the storage battery 150 is between a first and second reference set point the continuity light will be illuminated 1080 and the battery maintainer and charging apparatus 05 will maintain 2000 the storage battery 150 at the battery manufacturer's suggested maintenance charge. The maintenance circuit 2010 will remain operational until it detects that the battery is no longer present.

Figure 3:
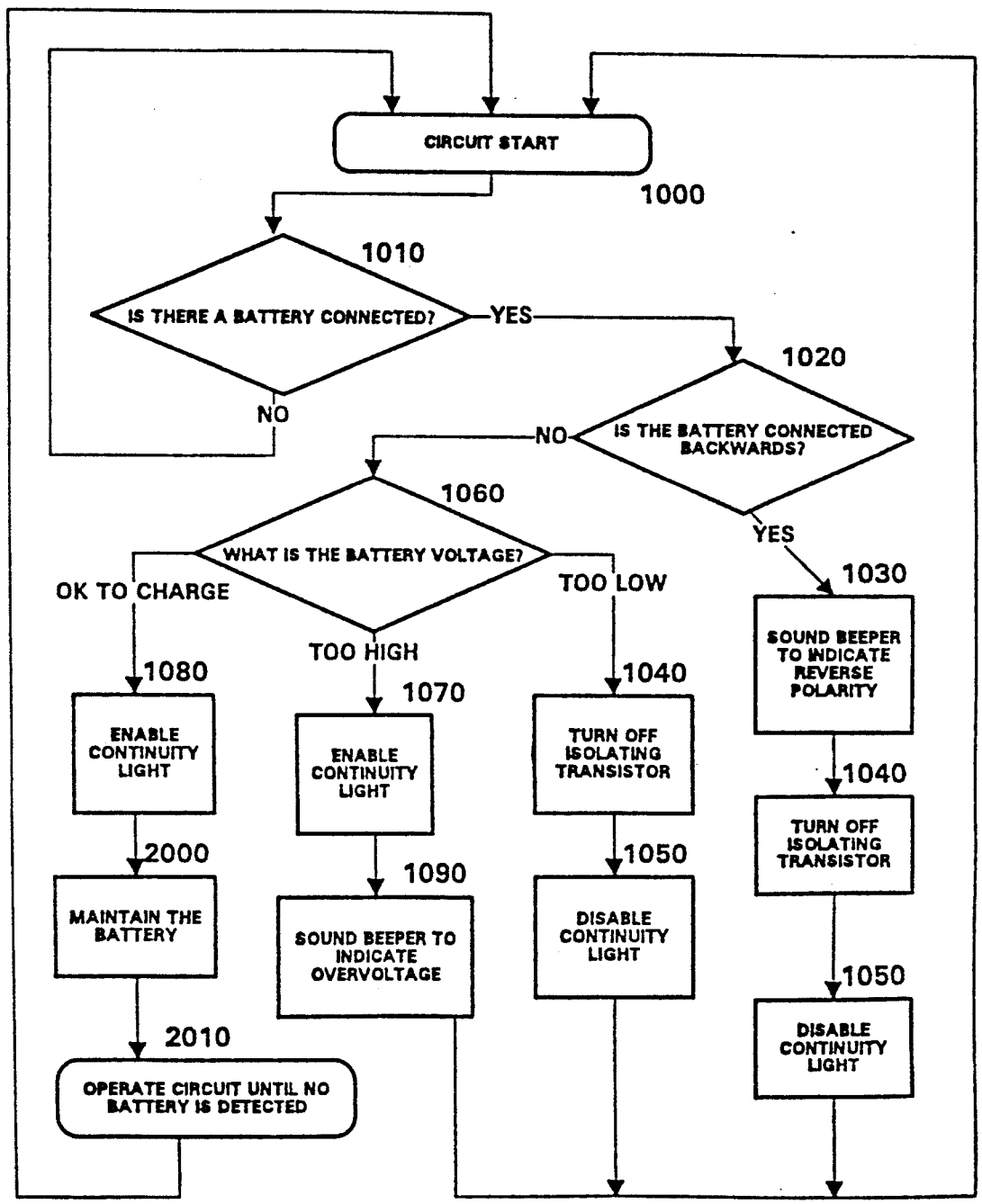
FIG. 3 is a flow diagram illustrating the battery voltage maintainance feature of the battery maintainer and charger apparatus.

Referring now to FIG. 3 and FIG. 1 in combination, FIG. 3 depicts the battery maintenance feature of the present invention. A reference voltage from the storage battery 150 is sent to the A/D converter 80, 2020. When the signal is sent from the storage battery 150, the battery voltage passes through the diode 620 and is divided by the resistors 450 and 460, 2030. Once the battery voltage has been divided by the resistors 450 and 460, that signal is sent to the LED bar graph 650 and the appropriate LED(s) 650 are illuminated to show current battery voltage 2040. A determination is then made 2050 as to which LED(s) 650 become illuminated at the LED bar graph 650 once the storage battery voltage has been determined.

If the storage battery voltage ranges between 0 and 13.6 volts, 2060, no LED will illuminate for a battery 150 voltage between 0 and 12.8 volts, LED 750 will illuminate if the battery voltage is determined to be 12.8 volts, LED's 740 and 750 will illuminate if the battery voltage is determined to be 13.0 volts, LED's 730, 740 and 750 will illuminate if the battery voltage is determined to be 13.2 volts, LED's 720, 730, 740 and 750 will illuminate if the battery voltage is determined to be 13.4 volts and LED's 710, 720, 730, 740 and 750 will illuminate if the battery voltage is determined to be 13.6 volts.

If the battery voltage is determined to be greater than 13.6 volts but less than 14.4 volts 2070, the LED's 700, 710, 720, 730, 740 and 750 will illuminate to indicate battery voltage of 13.8 volts, the LED's 690, 700, 710, 720, 730, 740 and 750 will illuminate to indicate battery voltage of 14.0 volts, the LED's 680, 690, 700, 710, 720, 730, 740 and 750 will illuminate to indicate battery voltage of 14.2 volts and the LED's 670, 680, 690, 700, 710, 720, 730, 740 and 750 will illuminate to indicate battery voltage of 14.4 volts.

If the storage battery voltage is greater than 14.4 volts 2080, the LED's 660, 670, 680, 690, 700, 710, 720, 730, 740 and 750 will illuminate. If the battery voltage is determined to be less than 13.6 volts 2060, the hysteresis latch 300 will activate its trigger 470 and charge the storage battery 150 at a high voltage setpoint. Next, the low voltage set point indicating LED 530 will become disabled 2000. The power transistor 90 is then modulated 3010 to maintain current limit up to the high voltage set point to increase the storage battery 150 voltage above 13.6 volts. Once the battery 150 voltage has risen above 13.6 volts but is below 14.4 volts 2070, the power transistor 90 is modulated to maintain previous voltage setpoint at or below the current limit 3020. The storage battery 150 voltage of 13.8 volts is within the range of the battery manufacturer's suggested optimum voltage.

When the storage battery 150 voltage is above 14.4 volts 2080, the hysteresis latch 300 will be reset to the low voltage setpoint. Once the low voltage set point has been engaged, the low voltage set point indicating LED 530 will be illuminated 3040. Once again, the power transistor 90 will be modulated to maintain a low voltage setpoint at or below current limit 3050, so as not to over charge the storage battery 150. The power transistor 90 limits the current to achieve the ideal storage battery voltage and will continue to monitor and adjust the current limiting feature of the transistor 90 indifinitely.

Figure 4:
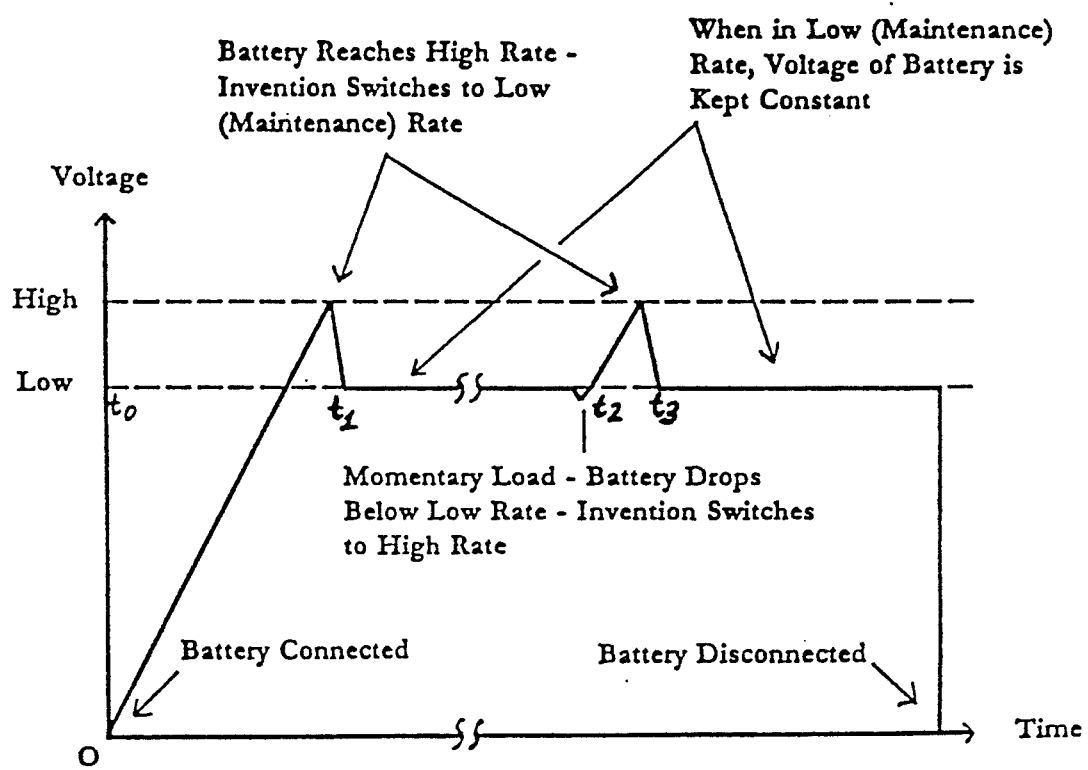
FIG. 4 illustrates the regulated voltage output of the present invention over time.

Referring now to FIG. 4, the voltage output over time is illustrated. The voltage of the storage battery 150 approaches a constant rate. The initial voltage of the battery varies due to any number of factors, i.e., voluntary and involuntary discharging, temperature, etc. The battery is however charged at a high voltage until the battery becomes fully charged. When the battery becomes fully charged, the battery charger and maintainer goes into the maintenance mode where the voltage is kept constant and the life of the storage battery is optimized.

Referring not to FIG. 5, the charging current is limited at a maximum level and varies between the maximum level and zero forward current flow. The current flows at maximum flow when the battery maintainer and charger apparatus is first connected to storage battery exhibiting a predetermined minimum acceptable amount of voltage and not being fully charged. The maximum current flow will again engage the storage battery 150 when there is a momentary load placed on the battery which causes a drain of voltage. However, the current will again be varied when the battery becomes fully charged. During the time period $t_1$-$t_2$ the current is variable and can vary between maximum current flow, intermediate current flow and zero current flow. When the storage battery 150 does not require any current to maintain its voltage, the current flow will go to zero and no current will flow to the storage battery until a need for the current develops.

Figure 6:
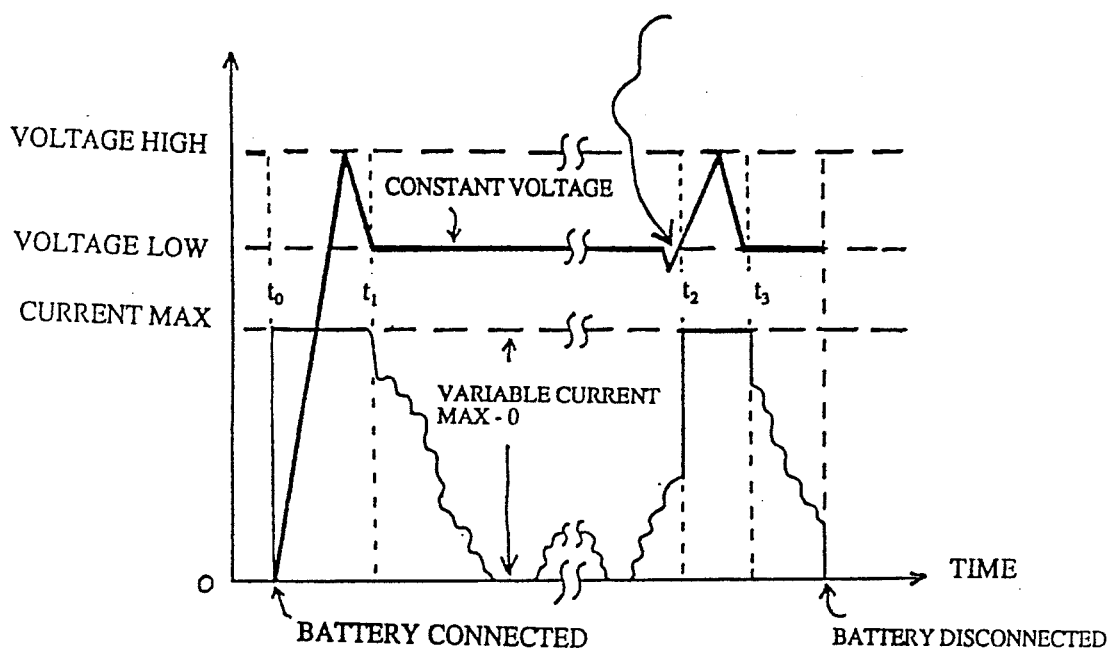
FIG. 6 illustrates voltage and current of the present invention combined in operative association over time.

FIG. 6 illustrates the voltage and current of the present invention combined over time. At $t_0$ the storage battery 150 becomes engaged to the present invention and a maximum charging current is applied to the storage battery 150 having sufficient minimum voltage until the storage battery 150 voltage reaches a high voltage reference point and no longer needs charging current, $t_1$. During the time interval $t_1$-$t_2$ the voltage of storage battery 150 remains constant but the charging current varies so as not to overcharge the storage battery 150. The charging current can go to zero during this time thereby not applying any charging current to the battery. During $t_1$-$t_2$, should the storage battery 150 experience a momentary load and the storage battery voltage drop below the low voltage reference point, the maximum current will engage the storage battery until the battery becomes fully charged, where the current will once again be varied and the storage battery 150 voltage will be maintained at a constant voltage to optimize the life of the storage battery.

OPERATION

The battery maintainer and charger apparatus operates quite distinctly from the prior art battery chargers. Most prior art battery chargers modulate a voltage to maintain a high or low current flow into the storage battery 150, never interrupting the forward flow charging current. The present invention modulates an amount of current to maintain a voltage potential across the storage battery, whereby the current flow can actually fall to zero current flow. Thus the charging current is limited and voltage is regulated in the present invention to maintain the storage battery 150 voltage and not simply a two position, voltage limited, current regulated battery charger as taught in the prior art.

The integrated circuit for generating an internal voltage reference which acts as a battery charger sensing means to provide charging input and control circuit power to the battery maintainer and charger apparatus.

Electrical energy 10 is obtained from a commercial source of 120 vac power and applied to step down transformer 20. The low voltage AC is presented to the full wave bridge rectifier 30 and rectified into DC. The DC voltage is then filtered by a capacitor 40 and communicated to the voltage regulator integrated circuit 70 for Vcc power and to the voltage regulator 50 to provide a 15 vdc power supply to operate the other circuit components. A filtered capacitor 60 is placed on the output of the voltage regulator 50 to stabilize the 15 v output.

A lead acid battery 150, when engaged with terminal 180 for a ground reference and terminal 170 for a positive reference will supply forward voltage through a reverse polarity blocking diode 620 and charge a signal filtering capacitor 610. A voltage divider network consisting of a first resistor 450 and a second resistor 460 will reduce the full battery voltage potential to a ratio metric fraction suitable for the voltage regulator integrated circuit 70 input 440 and the analog to digital convertor 80 input 490. The voltage signal applied to the voltage regulator integrated circuit 70 input 440 and analog to digital convertor 80 input 490 will be further stabilized by the capacitor 630.

The voltage regulator integrated circuit 70 also provides a circuit reference voltage at the voltage reference pin 520. This circuit reference voltage is divided by a plurality of resistors 760, 770 and 780. The voltage potential at the voltage reference pin 790 on the analog to digital convertor 80 is the high voltage reference value and will illuminate the LED 660 when the signal at reference pin 490 is the same or greater than the voltage reference at reference pin 790. When the LED 660 is illuminated, the integrated circuit for generating an internal voltage reference senses that the storage battery 150 does not need to be charged using the high charging rate. The voltage potential at the reference pin 800 is the low reference value and will illuminate an LED 750 when the signal at the reference pin 490 is equal to the signal at the reference pin 800. The plurality of intermediate LED's 670, 680, 690, 700, 710, 720, 730, and 740 will reflect equal fractions of the voltage span between the reference pins 790 and 800. When the plurality of intermediate LED's 670, 680, 690, 700, 710, 720, 730 and 740 are illuminated or the low reference value LED 750 is illuminated, the storage battery 150 will receive a voltage regulated charging current greater than the low charging rate. The plurality of resistors 640, 810, 820 and 830 act as current limiting resistors for the LED bargraph display 650.

The battery voltage monitoring circuit and controller which compares the battery voltage with two reference voltages and in response controls a means for providing either a high rate of charging current or a trickle charging rate of current to the storage battery 150 are described below.

The positive terminal of the storage battery 150 is engaged to the positive terminal 170 of the present invention. The electrical potential of the storage battery 150 flows through the reverse polarity blocking diode 620, is filtered by a capacitor 610 and divided by a plurality of resistors 450 and 460. One or more capacitors 630 stabilize the signal for input to the analog to digital display 80 at the reference pin 490 and one or more capacitors 600 couple the input to the voltage regulator integrated circuit 70 at the input reference pin 440 internally to the frequency control of the output signal that drives the main transistor 90 base signal.

The voltage regulator integrated circuit 70 operates in such a manner that the output signal that drives the base of the main transistor 90 will vary as a result of the variance between the voltage of the non-inverting input reference pin 430 and the inverting input reference pin 440. The voltage at the inverting input reference pin 440 will vary with the storage battery's 150 voltage. The voltage on the non-inverting input pin 430 will be one of two reference voltages depending on the output state of dual timer 300 at output lead pin 410 and the value of the voltage divider resistors 510 and 500 and the output of the blocking diode 420.

When the storage battery 150 is at a voltage potential low enough to require display on the analog to digital convertor 80, one or more LED's 710, 720, 730, 740 or 750 will be illuminated. The current limiting resistor 830 will provide a voltage drop sufficient to trigger the timer 300 set pin 470. The current limiting resistor 560 and capacitor 470 stabilize the trigger signal at the timer 300. When the timer 300 is triggered, its output voltage at output lead pin 410 is a high charging voltage at or near +15 vdc. The blocking diode 420 prevents current flow from the timer 300 output at output lead pin 410 and allows the voltage regulator integrated circuit 70 reference voltage to be presented to the non-inverting input pin 430 through resistor 510 and will serve as the high reference voltage. When the pin 550 of timer 300 is in an open collector condition, no current will flow through the resistor 540 and the low voltage charging rate LED 530 will disengage.

While the storage battery 150 is being charged, the voltage regulator integrated circuit 70 will modulate the base current to the main power transistor 90 to attempt to maintain the reference voltage of input pin 430 as sensed by pin 440. The voltage drop across resistor 100 will feed back into the voltage regulator integrated circuit 70 to override the output signal to the base of transistor 90 and limit charging current to a maximum value. The power indicating LED 120 will be illuminated when the transistor 90 is engaged and current for this LED 120 will be limited by the current regulator 130 and have the current limited by the voltage drop across the resistor 140. Charging current for the battery will pass through the isolation transistor 110 and out through the final isolating diode 160 to the storage battery 150 under charge.

When the storage battery 150 voltage requires the analog to digital convertor 80 to illuminate LED 660, a voltage divider comprised of the pull-up resistor 810, the LED 660, the current limiting resistor 580 and the voltage dividing resistor 590 will cause a reset of the timer 300 at pin 480 and the timer 300 discharge pin 550 will be grounded, causing the low rate LED 530 to become illuminated by the current limiting resistor 540. The timer 300 output will become grounded and the voltage divider consisting of voltage reference pin 520, resistors 510 and 500 and diode 420 will apply the low reference voltage to the non-inverting input pin 430 of the voltage regulator integrated circuit 70.

The safety means of the present invention which protects the storage battery 150 as well as the operator from improper connections and overcharging are discussed below.

If the storage battery 150 is improperly engaged to the present invention, i.e., reversed polarity, the blocking diode 620 will cease to conduct current and no current will be drawn from the circuit through the blocking diode 620. The blocking diode 190 will cease to conduct and the optical isolator 220 will stop supplying a base current to the isolation transistor 110 and the LED 260 which indicates an absence of reversed polarity.

The isolation diode 160 will conduct current and will allow the resistor 280 to bring the base current and the isolation transistor 110 to the same potential thereby engaging the isolation transistor 110 and interrupting any current flow from the charging circuit into the storage battery 150. During this period of reversed polarity the diode 860 will become forward biased and allow current to flow through the full wave bridge rectifier 840 and sound the piezo-electric beeper 850 indicating an improper connection of the storage battery 150 to the battery maintainer and charger apparatus.

If a storage battery 150 is properly connected at the terminals 170 and 180, then the isolating diode 190 will apply the voltage from storage battery 150 to the current limiting resistor 200 and the Zener diode 210. The storage battery 150 voltage at the positive terminal 170 must be of sufficient voltage to reverse bias the diode 210 before current can be provided for the first optical isolator 220 and the forward bias LED 260. The diode 240 will protect the first optical isolator 220 and the LED 260 from over voltage at the positive terminal 170.

When a storage battery 150 containing more than 6 cells is connected to the terminals 170 and 180, the voltage regulator integrated circuit 70 will modulate off the main power transistor 90, current will cease to flow from the voltage regulator integrated circuit to the storage battery 150 and the final isolating diode 160 will be reverse biased and block current flow from the storage battery 150 to the present invention. The zener diode 860 will also become reverse biased and will flow current through the full wave bridge rectifier 840 and sound the audible alarm piezeo-electric beeper 850 while the analog to digital convertor 80 illuminates the maximum voltage indicator LED 660.

The timer component 290, the plurality of resistors 310, 320, 330, and 350, the capacitor 340 and the diode 360 all comprise a typical astable multi-vibrator circuit. The electrical output at output pin 390 is used to supply interrupted current to illuminate the optical isolator 230. During the interval that timer component 290 is supplying interrupted current to the optical isolator 230, if a storage battery 150 containing a minimal amount of charge is connected to the terminals 170 and 180, then the optical isolator 220 will supply saturation base current as limited by the resistor 270 to the base of the the transistor 110. If the storage battery under charge is disconnected, then optical isolator 220 will not be illuminated and no base current will pass to the transistor 110 and diode 160 will interrupt the flow of forward current until a storage battery 150 having a minimal amount of current is engaged to the battery charger and maintainer apparatus.

What is claimed is:

1. A battery maintainer apparatus for preserving a storage battery at the optimum charge, comprising:
    a charging means for charging the storage battery to a full charge; and
    a maintainer means for maihtaining the battery at the full charge, wherein the maintainer means comprises:
        a sensing means, to sense the voltage of the storage battery, wherein at least a minimal amount of voltage must be detected before the battery maintainer apparatus applies a charging current to the storage battery;
        a comparison means, to compare the storage battery voltage against a high voltage reference and a low voltage reference, wherein charging current will be applied to the storage battery when the storage battery voltage is greater than the low voltage reference but less than the high voltage reference;
        a controller, to selectively vary the charging current applied to the storage battery, wherein the charging current is a current limited/voltage regulated charging current such that when the storage battery is in a transient state the charging current is constant and the voltage is varying, and when the battery is in a maintenance state the current is varying and the voltage is constant, the charging current having a low charging current of zero milliamps, a high charging current of 300 milliamps and an intermediate charging current selectively variable between zero milliamps and 300 milliamps, to maintain the storage battery voltage at a generally constant voltage; and
        a safety means, to selectively divert the charging current away from the storage battery when the storage battery voltage is less than the low voltage reference and when the polarities of at least one output terminal and the storage battery become reversed.

* * * * *